US008023967B2

(12) United States Patent
Daniels et al.

(10) Patent No.: US 8,023,967 B2
(45) Date of Patent: *Sep. 20, 2011

(54) CONSOLIDATING ONLINE PRIVACY PREFERENCES

(75) Inventors: Fonda J. Daniels, Cary, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

This patent is subject to a terminal disclaimer.

(21) Appl. No.: 12/133,168

(22) Filed: Jun. 4, 2008

(65) Prior Publication Data
US 2008/0242318 A1 Oct. 2, 2008

Related U.S. Application Data

(63) Continuation of application No. 10/463,387, filed on Jun. 17, 2003, now Pat. No. 7,403,785.

(51) Int. Cl.
*H04Q 7/20* (2006.01)
(52) U.S. Cl. ............... 455/456.3; 455/456; 455/411
(58) Field of Classification Search ............... 455/456.3, 455/411, 456.1, 456.2, 456.6, 422.1; 370/352, 370/493; 709/228, 219, 231; 705/14.64, 705/14.58, 14.73
See application file for complete search history.

(56) References Cited

U.S. PATENT DOCUMENTS

| 5,334,974 | A | 8/1994 | Simms et al. ............... 340/990 |
| 5,555,376 | A | 9/1996 | Theimer et al. .......... 395/200.09 |
| 5,596,500 | A | 1/1997 | Sprague et al. ............ 364/449.7 |
| 5,797,091 | A | 8/1998 | Clise et al. .................... 455/404 |
| 5,835,907 | A | 11/1998 | Newman ........................ 707/10 |
| 6,075,993 | A | 6/2000 | Kawamoto .................. 455/456 |
| 6,127,945 | A | 10/2000 | Mura-Smith ................. 340/988 |
| 6,160,481 | A | 12/2000 | Taylor, Jr. .................. 340/573.4 |
| 6,236,365 | B1 | 5/2001 | LeBlanc et al. ............... 342/457 |
| 6,236,978 | B1 | 5/2001 | Tuzhilin ......................... 705/26 |
| 2002/0083157 | A1 | 6/2002 | Sekiguchi et al. ............ 709/219 |
| 2002/0160766 | A1 | 10/2002 | Portman et al. .............. 455/422 |
| 2005/0027590 | A9* | 2/2005 | Gailey et al. .................. 705/14 |

* cited by examiner

*Primary Examiner* — Melur Ramakrishnaiah
(74) *Attorney, Agent, or Firm* — VanLeeuwen & VanLeeuwen (57) ABSTRACT

User privacy preferences are consolidated for location-based services. A mobile user is able to control the service providers to which the mobile user's location is transmitted as well as control the service providers from which the user wishes to receive content. Service providers and other online vendors request the location and network identifiers of mobile users in order to provide the mobile users with content. The user's privacy preferences are described in a document that includes the location format being used by the user, a link to the user's preference data, and the current location of the user's mobile device. The privacy preference file includes global privacy preferences that apply when the user is outside of established privacy locations and one or more privacy locations defined by geographical boundaries. These preferences apply while the user is inside the defined privacy location.

18 Claims, 5 Drawing Sheets

CONSOLIDATING ONLINE PRIVACY PREFERENCES

RELATED APPLICATIONS

This application is a continuation application of co-pending U.S. Non-Provisional patent application Ser. No. 10/463,387, entitled "System and Method for Consolidating Online Privacy Preferences," filed on Jun. 17, 2003.

BACKGROUND OF THE INVENTION

1. Technical Field

The present invention relates in general to a system and method for consolidating privacy preferences. In particular, the present invention extends Internet privacy preferences by creating location-based privacy preferences.

2. Description of the Related Art

Modern computer users are increasingly mobile users that frequently travel with pervasive computing devices, such as laptop computers, personal digital assistants, mobile telephones, and the like. Pervasive computing devices are becoming ever smaller, and thus more mobile, devices. In addition, wireless communication networks are reaching more distant places, allowing the user to be connected to a computer network, such as the Internet, almost irregardless of the user's physical location.

Today, Internet users are asked on a frequent basis to decide whether and under what circumstances to disclose personal information. The P3P (Platform for Privacy Preferences) specification, developed by W3C (the World Wide Web Consortium), defines an industry standard that provides a simple, automated way for users to gain more control over the use of personal information on Web sites they visit. When implemented in Web sites and browsers, the P3P specification is intended to bring a measure of ease to Web users wishing to decide when and under what circumstances personal information is disclosed.

At present, the P3P specification is focused primarily on wired Web privacy. However, as users become increasingly mobile, wireless and location-based services introduce new and heightened privacy concerns for consumers. The risks include unintentional or mistaken disclosure of personal information as well as access of sensitive, or confidential, information by unauthorized individuals. A challenge of the current P3P specification and current state of the art is that clear wireless privacy rules and regulations are lacking. Because of this, wireless location technology has the potential to pinpoint the geographic location of mobile users as well as track the movements and activities of such users. Another challenge with the prior art is that collection and cross-referencing of new levels of personal information will likely increase. Hence, wireless providers and carriers may be privy to users' personal information as well as the users' current geographic locations.

What is needed, therefore, is a system and method for providing users with the ability to choose when and where personal information is shared. This system and method should allow a user to choose to be anonymous in one location context, and identifiable in a different context.

SUMMARY

It has been discovered that the foregoing challenges are overcome using a system and method that consolidates user privacy preferences for location-based services. Using the system and method, a mobile user is able to control the service providers to which the mobile user's location is transmitted as well as control the service providers from which the user wishes to receive content.

Service providers and other online vendors request the location and network identifiers of mobile users in order to provide the mobile users with content. Two modes of operation are supported. In a "push" operation mode, the service provider sends content to the location service agent which, based upon users' privacy preferences, sends the data to those users wishing to receive the content. In a "pull" operation mode, the user requests content ("pulls") from service providers based upon the user's location and the user's privacy preferences.

The user's privacy preferences are described in an XML location document that includes the location format being used by the user, a link to the user's preference data, and the current location of the user's mobile device. The user's preference data is stored in a file that is linked to the XML location document. The privacy preference file includes global (default) privacy preferences that apply when the user is outside of established privacy locations. The user can also set up one or more privacy locations defined by a boundary (geographical coordinates) of each privacy location and the user's privacy preferences that apply while the user is inside the defined privacy location.

For example, the user may set up a default privacy preference that allows advertisements of restaurants to be received by the user's mobile device. In this manner, when the user is traveling, restaurant advertisements would be received notifying the user of nearby restaurants. The user could then set up a defined privacy location of the user's city of residence that does not allow restaurant advertisements to be received by the user's local device. Consequently, the user would not be bothered by restaurant advertisements near his home, as he likely knows the location of many restaurants, but would receive such information when traveling outside the user's city.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
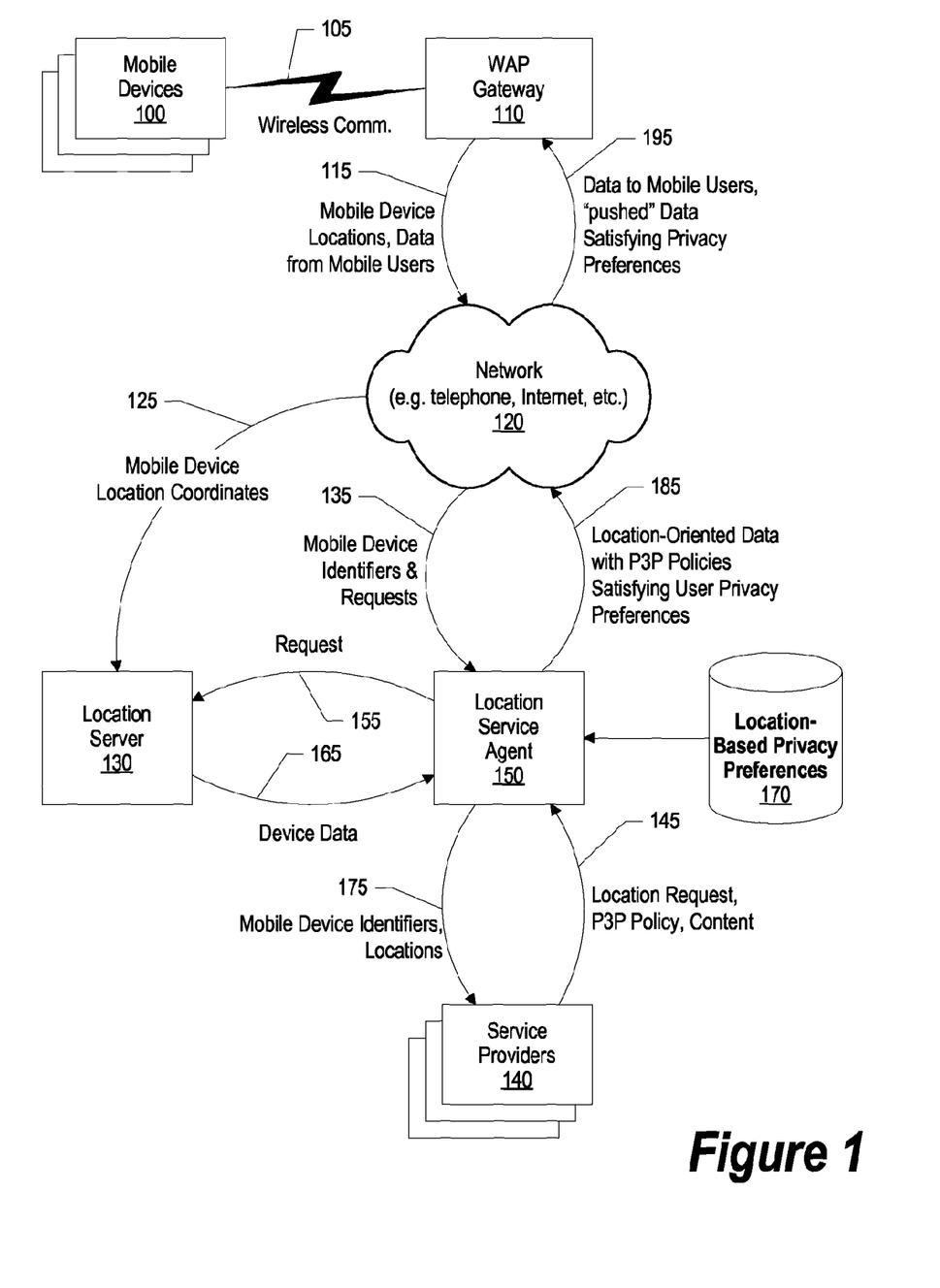
FIG. 1 is a network diagram depicting location-based privacy preferences being applied to mobile devices.

FIG. 1 is a network diagram depicting location-based privacy preferences being applied to mobile devices.

Mobile devices 100, such as Personal Digital Assistants (PDAs), mobile telephones, and mobile computing devices, receive content from service providers 140 based upon the user's location-based privacy preferences 170.

While a user is traveling, the user's mobile device 100 communicates over wireless pathway 105 to a WAP Gateway. "WAP" is the abbreviation for the Wireless Application Protocol, a secure specification that allows users to access information instantly via handheld wireless devices such as mobile phones, pagers, two-way radios, smartphones and communicators. WAP supports most wireless networks. These include CDPD, CDMA, GSM, PDC, PHS, TDMA, FLEX, ReFLEX, iDEN, TETRA, DECT, DataTAC, and Mobitex. WAP is supported by all operating systems. Ones specifically engineered for handheld devices include PalmOS, EPOC, Windows CE, FLEXOS, OS/9, and JavaOS. Because of its wide support, WAP can be used by the user whether using a handheld portable device or telephone or an operating system running on a notebook computer system.

WAPs that use displays and access the Internet run what are called microbrowsers—browsers with small file sizes that can accommodate the low memory constraints of handheld devices and the low-bandwidth constraints of a wireless-handheld network. Although WAP supports HTML and XML, the WML language (an XML application) is specifically devised for small screens and one-hand navigation without a keyboard. WML is scalable from two-line text displays up through graphic screens found on items such as smart phones and communicators. WAP also supports WMLScript. It is similar to JavaScript, but makes minimal demands on memory and CPU power because it does not contain many of the unnecessary functions found in other scripting languages.

WAP Gateway 110 is typically a fixed (land-based) computer system that communicates using the WAP protocol. In this manner, WAP Gateway receives mobile device location (GPS) data and other data from the mobile device (115) in WML, HTML, XML, and other formats and forwards the data to network 120 (e.g., the Public Switched Telephone Network (PSTN), the Internet, a private corporate or government computer network, etc.). WAP Gateway 110 also receives data 195 that includes content encapsulated in WML, HTML, or XML documents that is being sent by service providers 140 to mobile devices 100.

Network 120 interconnects the various network components of the system including WAP Gateway 110, Location Server 130, Location Service Agent 150, and Service Providers 140. Mobile device location coordinates 125 describe the mobile device's current location. Mobile device location coordinates 125 is transmitted through network 120 to location server 130.

Location service agent 150 receives requests from mobile devices 100, for those devices operating in a "pull" operating mode, as well as from service providers 140, for those devices operating in a "push" operating mode. Location service agent 150 compares the privacy policy of the service provider with the location-based privacy preference of users, stored in data store 170, along with the user's current location, retrieved from location server 130, to determine whether to redirect content from a particular service provider to a particular mobile device.

In a "push" operating environment, service providers 140 transmit the service provider's privacy policy, location data, and content to location service agent 150 in transmission 145. For example, the service provider might be a restaurant in Raleigh, N.C. with a particular privacy policy that specifies, among other things, that the restaurant does not share user data with others and that the restaurant's server does store cookies on the user's computing device. The content that the restaurant wishes to provide is an advertisement to the restaurant, and the location to which the restaurant wishes to cover are computing devices in the Raleigh-Durham area of North Carolina.

Location service agent 150 requests mobile device data from location server 130 corresponding to the mobile devices that are currently in the service provider's intended location (i.e., Raleigh-Durham N.C.) and receives from location server 130 the mobile device identifiers, such as the IP address, of all those devices currently in the service provider's intended location. Location service provider 150 retrieves the privacy preferences for each of the mobile users that are currently in the service provider's intended location from location-based privacy preferences data store 170. The user's privacy preferences are compared with the service provider's privacy policy to determine whether to transmit the service provider's content to the corresponding mobile device. For example, if the mobile device has requested not to receive advertisements, or not to receive content from a Web site that stores cookies on the user's mobile device, then the location service agent, using the example above, would not transmit the restaurant's advertisement. Furthermore, the user might have decided to receive this type of content outside of Raleigh-Durham, but not in the Raleigh-Durham area.

In a "pull" operating environment, the user's mobile device requests content from service providers that have a privacy policy consistent with the user's privacy preferences. In this environment, the user's location is provided by the user, the location service agent matches the user's location and privacy policy with service providers, and transmits content back to the user from those service providers that match the user's location and location-based privacy preferences.

In one embodiment, location service agent 150 is incorporated, along with privacy preferences 170, into the Web site of service providers 140. In another embodiment, the location service agent is a separate Web site that provides the service of matching mobile users to content being provided by service providers.

Figure 2A:
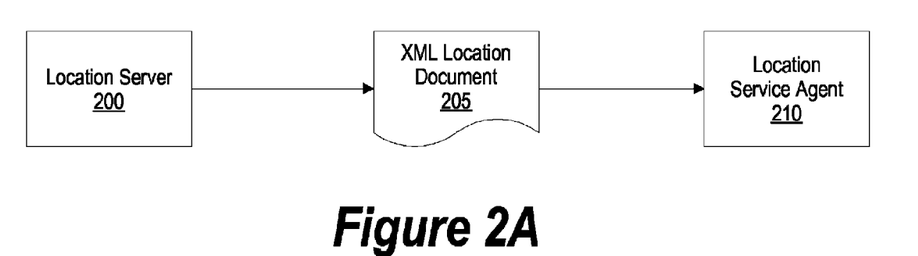
FIG. 2A is a diagram showing mobile user location information being provided to a service agent.

FIG. 2A is a diagram showing mobile user location information being provided to a service agent. Location server 200 receives location-based data from mobile devices that are being used by mobile users. The location server creates XML location document 205 that is forwarded to location service agent 210 for comparison against service provider privacy policies and determining whether to send the service provider's content to the mobile device.

Figure 2B:
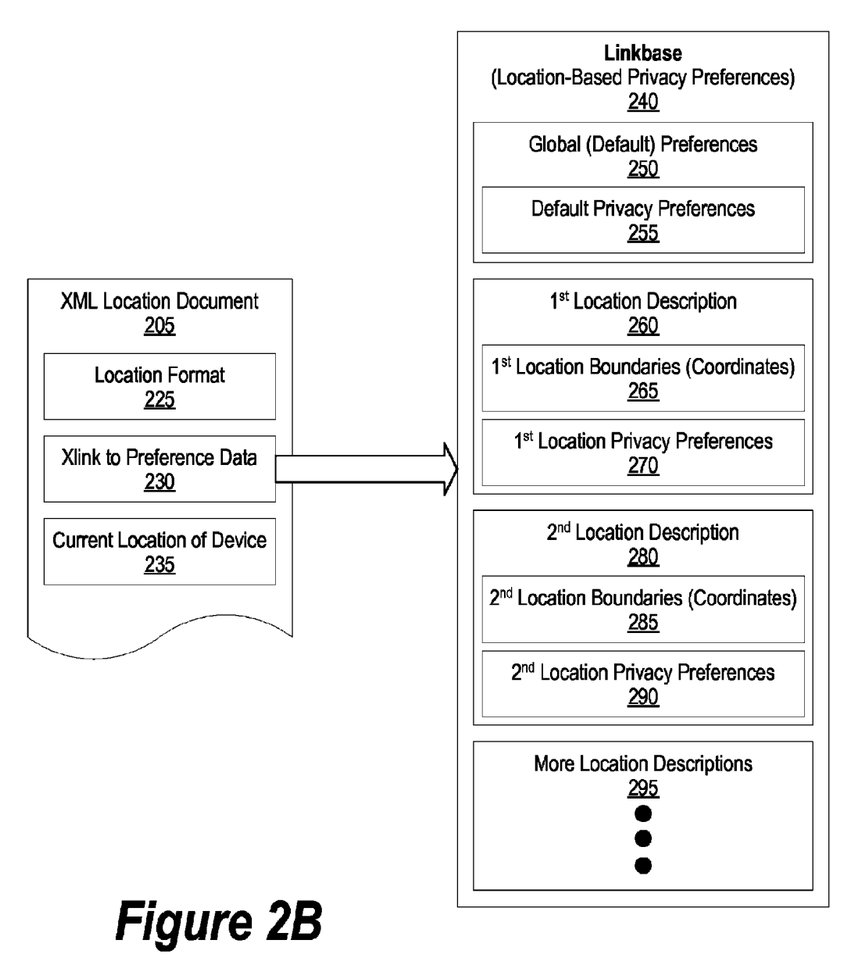
FIG. 2B is a data diagram showing data included in the location document as well as privacy preference data included in the linkbase linked to the location document.

FIG. 2B is a data diagram showing data included in the location document as well as privacy preference data included in the linkbase linked to the location document. XML location document 205 is shown to include location format 225, XLink to the user's location-based privacy preference data 230, and current location 235 of the user's mobile device.

Location format 225 is the geographic location format that is used by the user's mobile device. Examples of possible location formats include GPS coordinate format, postal (zip) code format, area code format, etc. The format used may be related to the type of mobile device being used by the user. For example, a mobile device that is a telephone might use the area code in which the device is currently located as such information can be provided by base station currently used by the mobile telephone. A cellular based format, providing more granularity than an entire area code, might also be used by mobile devices that access a cellular network. A computing device, such as a handheld computer or a notebook computer, equipped with a GPS receiver might use a GPS coordinate format.

XLink 230 is a XML document link to linkbase 240 that describes the user's privacy preferences. XLink is an abbreviation for XML Linking Language, a computer language that allows both unidirectional and bidirectional links to other resources (e.g., files, images, documents, programs, query results) to be embedded in XML documents, similar to the hyperlinks found in HTML Web pages. XLink gives XML documents the ability to assert linking relationships among two or more resources, associate a link with metadata, and express links that are in a location separate from the linked resources.

Linkbase 240 is referenced by XML Location Document 205 and includes location-based privacy preferences for the user. These privacy preferences include global (i.e., default) preferences 250 and various location-specific privacy preferences, such as $1^{st}$ location 260, $2^{nd}$ location 280, and other locations 295. Each location includes an optional description that describes the location, such as "Raleigh-Durham N.C." Each location includes location boundaries (location boundaries 265 corresponding to $1^{st}$ location 260, and location boundaries 285 corresponding to $2^{nd}$ location 280). These locations include boundaries in the user's specified format. For example, using a postal code format, the boundaries would include the postal codes that are included in the location. In an area code or cellular format, the boundaries would include the area code(s) and/or cellular station identifiers that are included in the location. In a GPS format, the boundaries would include the GPS coordinates that define the location boundaries.

The user's privacy preferences are defined for each defined location. Default preferences 255 apply to any location that does not fall within a defined location. 1st location privacy preferences 270 apply whenever the user is within the $1^{st}$ location as defined by $1^{st}$ location boundaries 265. Likewise, $2^{nd}$ location privacy preferences 290 apply whenever the user is within the $2^{nd}$ location as defined by $2^{nd}$ location boundaries 285.

Figure 3:
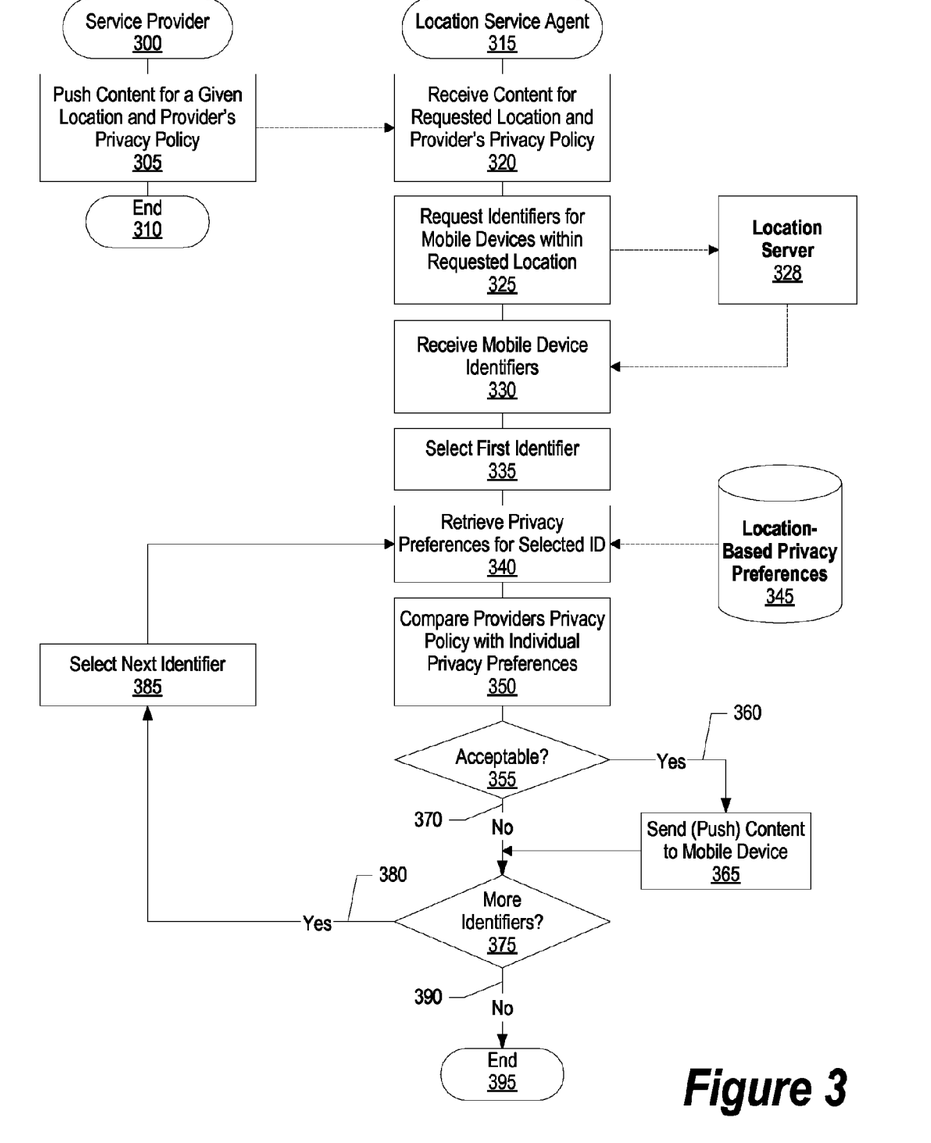
FIG. 3 is a flowchart showing steps taken by the location service agent to determine whether to push content to a mobile device.

FIG. 3 is a flowchart showing steps taken by the location service agent to determine whether to push content to a mobile device. Service provider processing commences at 300 whereupon the service provider sends content for a given location (e.g., Raleigh, N.C.) and the provider's privacy policy to a location service agent at step 305. Service provider processing thereafter ends at 310.

Location service agent processing commences at 315 whereupon the location service agent receives the content, location information, and privacy policy from the service provider at step 320. At step 325, the location service agent requests the device identifiers (e.g., IP addresses, etc.) for the mobile devices that are within the location specified by the service provider from location server 328. At step 330, the location service agent receives the mobile device identifiers from the location server in response to the request.

At step 335, the first mobile device identifier is selected from those received by the location service agent. At step 340, the privacy preferences are retrieved from location based privacy preferences data store 345 based upon the mobile device identifier for the location in which the user's mobile device is currently located. At step 350, the retrieved location based privacy preferences are compared with the service provider's privacy policy (previously retrieved at step 320). A determination is made as to whether the service provider's privacy policy is acceptable to the user based upon the retrieved location based privacy preferences (decision 355). If the service provider's privacy policy is acceptable to the user given the user's current location, decision 355 branches to "yes" branch 360 whereupon the content is transmitted to the user's mobile device at step 365. On the other hand, if the service provider's policy is not acceptable to the user based upon the user's current location, decision 355 branches to "no" branch 370 bypassing step 365.

A determination is made as to whether there are more device identifiers to process within the service provider's requested location (decision 375). If there are more device identifiers to process, decision 375 branches to "yes" branch 380 whereupon processing selects the next identifier (step 385) and loops back to determine whether to send content to the newly selected device based upon that user's location-based privacy preferences. This looping continues until there are no more identifiers to process within the service provider's requested location, at which point decision 375 branches to "no" branch 390 and processing ends at 395.

Figure 4:
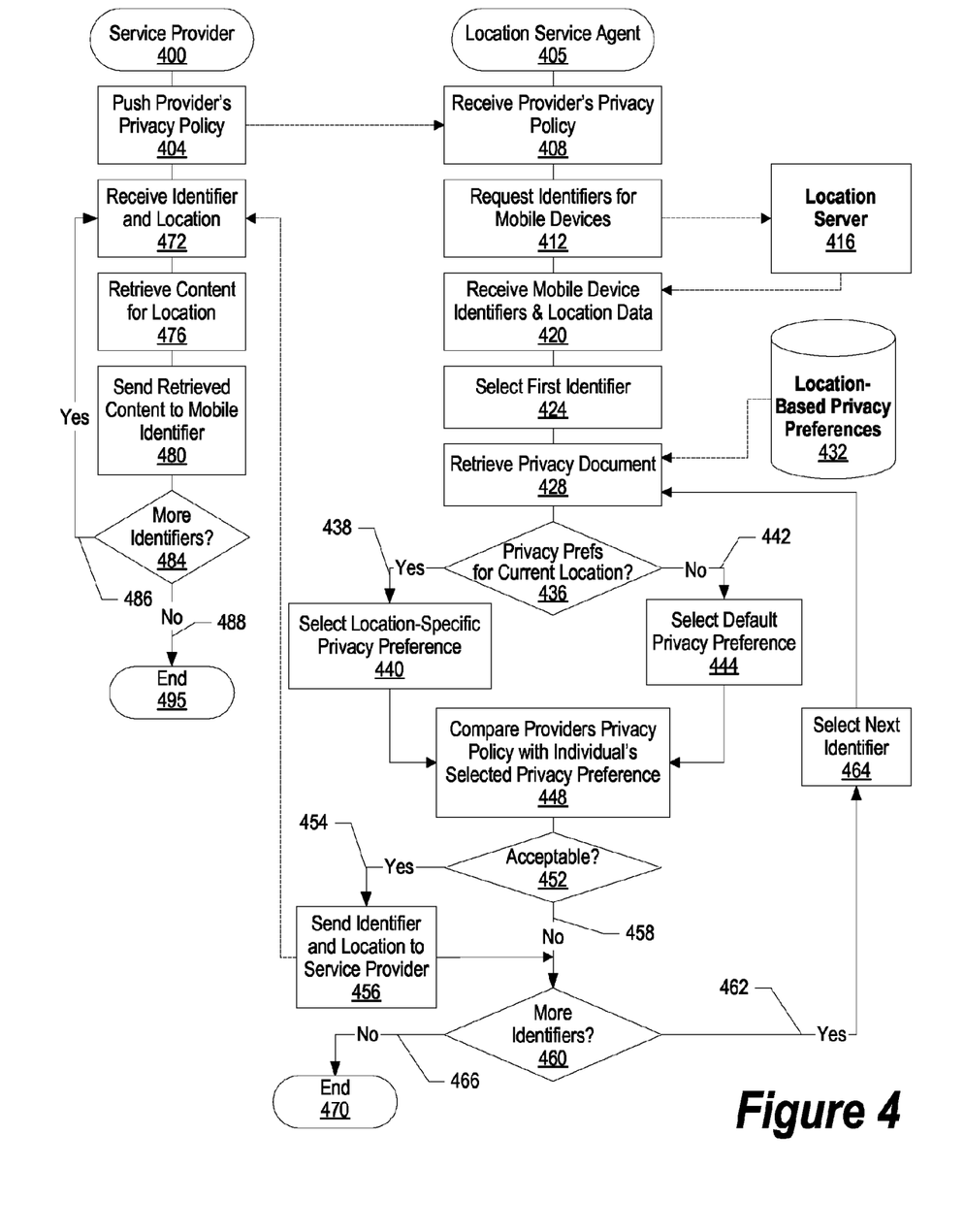
FIG. 4 is a flowchart showing steps taken by the location service agent to determine whether to provide a service provider with a mobile user's unique identifier and current location.

FIG. 4 is a flowchart showing steps taken by the location service agent to determine whether to provide a service provider with a mobile user's unique identifier and current location. Service provider processing commences at 400 whereupon the service provider's privacy policy is sent to the location service agent at step 404.

Location service agent processing commences at 405 whereupon, at step 408, the location service agent receives the service provider's privacy policy. At step 412, the location service agent requests mobile identifiers, such as IP addresses, from location server 415. The mobile device identifiers and location data are received from the location server at step 420.

The first mobile device identifier received from the location server is selected at step 424. At step 428, the user's location based privacy preferences are retrieved from location based privacy preferences data store 432 corresponding to the current location of the user's mobile device.

A determination is made as to whether the user has defined location-specific privacy preferences corresponding to the user's current location (decision 436). If the user has defined location-specific privacy preferences corresponding to the user's current location, decision 436 branches to "yes" branch 438 whereupon, at step 440, the location-specific privacy preferences are selected. On the other hand, if the user has not defined location-specific privacy preferences for the user's current location, decision 436 branches to "no" branch 442 whereupon the user's default privacy preference is selected at step 444.

After user privacy preferences have been selected, the selected preferences are compared with the service provider's privacy policy at step 448. A determination is made as to whether the service provider's privacy policy is acceptable based upon the user's privacy preferences (decision 452). If the service provider's privacy policy is acceptable, decision 452 branches to "yes" branch 454 whereupon the device identifier for the user's mobile device is returned to the service provider at step 456. On the other hand, if the service provider's privacy policy is not acceptable, decision 452 branches to "no" branch 458 bypassing step 456 and the user's mobile device address is not provided to the service provider.

A determination is made by the location service agent as to whether there are more device identifiers that were provided by the location server that need to be processed (decision 460). If there are more identifiers to process, decision 460 branches to "yes" branch 464 whereupon the next mobile device identifier is selected at step 464 and processing loops back to process the newly selected device identifier. This looping continues until there are no more device identifiers to process, at which point decision 460 branches to "no" branch 466 and location service agent processing ends at 470.

Returning to service provider processing, the service provider receives the user's mobile device identifier and location information at step 472. Content corresponding to the user's location is retrieved at step 476. For example, if the service provider is a national restaurant chain, content for a location might include the address and directions to restaurants in the user's current location along with general advertisements regarding specials and promotions offered either throughout the restaurant chain or that apply to the restaurants in the user's current location. The retrieved content is sent to the user's mobile device at step 480.

A determination is made by the service provider as to whether there are more mobile device identifiers that need to be processed (decision 484). If there are more identifiers that need to be processed, decision 484 branches to "yes" branch 486 whereupon processing loops back to receive the next mobile device identifier and provide location-based content to the identifier. This looping continues until there are no more identifiers to process, at which point decision 484 branches to "no" branch 488 and service provider processing ends at 495.

Figure 5:
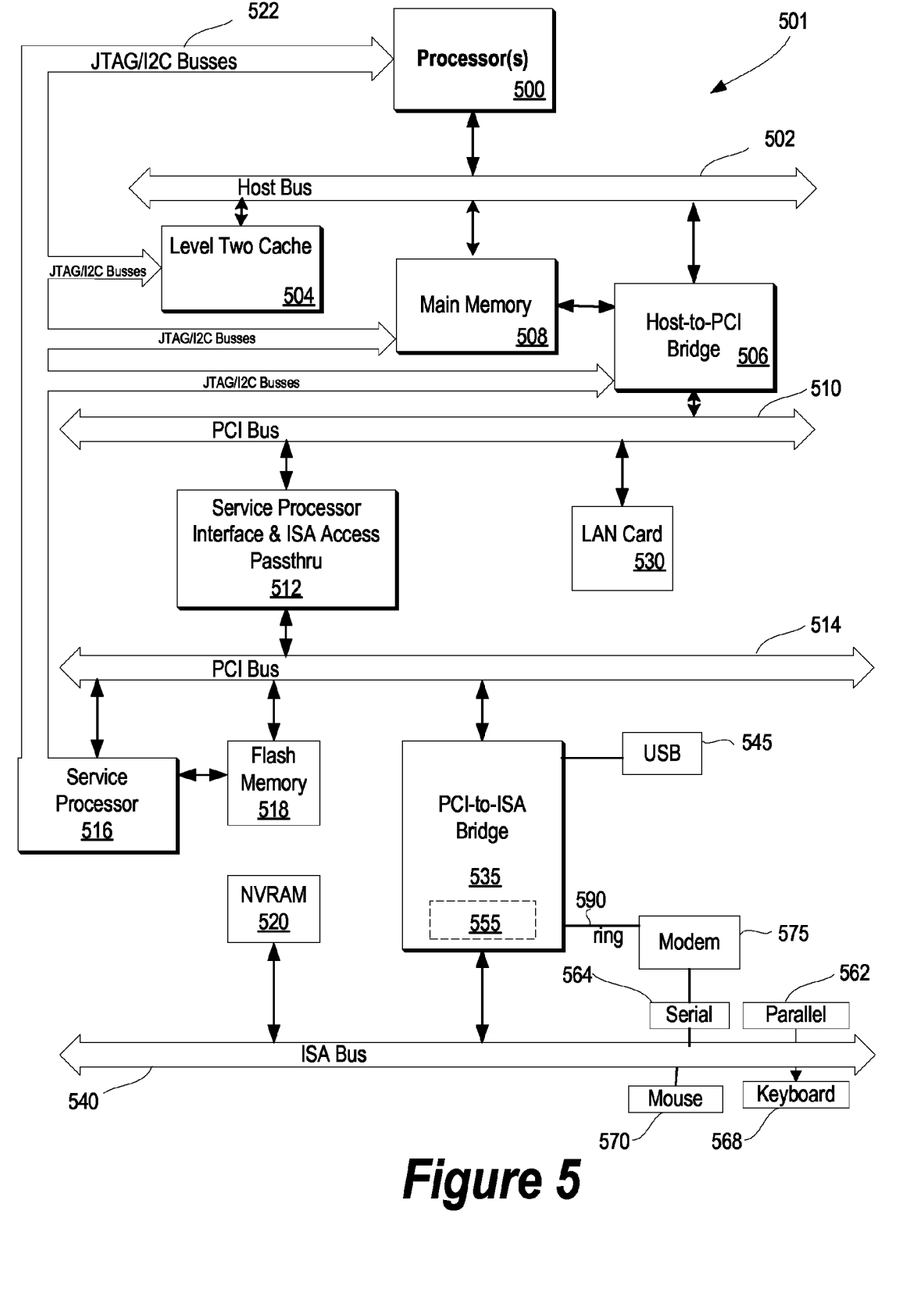
FIG. 5 is a block diagram of a computing device capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   a nonvolatile storage device accessible by the processors;
   a network interface for connecting the information handling system to a computer network; and
   a location-based privacy tool for managing user's location-based privacy preferences, the location-based privacy tool comprising software code effective to:
      receive a device identifier and location data corresponding to a device;
      retrieve a location-based privacy preference corresponding to the device identifier and the location data;
      compare the retrieved location-based privacy preference with a privacy policy that corresponds to a service provider; and
      determine whether to send content provided by the service provider to the device based upon the comparison.

2. The information handling system of claim 1 wherein the software code is further effective to:
   receive the content and the service provider's location from the service provider, wherein, in order to compare, the software code is further effective to:
      match the service provider location with one or more location boundaries that correspond to the location-based privacy preference.

3. The information handling system of claim 2 wherein the software code is further effective to:
   send the content to a device corresponding to the device identifier in response to the comparison determining that the service provider's privacy policy and location are acceptable to the retrieved location-based privacy preference that corresponds to the service provider's location.

4. The information handling system of claim 1 wherein the software code is further effective to:
   receive a geographic location corresponding to a device that is associated with the device identifier; and
   select the location-based privacy preference from a plurality of location based privacy preferences based upon the geographic location, wherein each of the plurality of location based privacy preferences correspond to a different geographical area.

5. The information handling system of claim 1 wherein the software code is further effective to:
   receive the service provider's privacy policy from the service provider over the computer network;
   select one or more device identifiers in response to the comparison of the location based privacy preference of each of the selected device identifiers with the received privacy policy; and
   send the selected device identifiers to the service provider across the computer network.

6. The information handling system of claim 1 wherein the software code is further effective to:
   identify a geographic location corresponding to the device identifier, wherein the retrieval of the location-based privacy preference is also based on the geographic location.

7. The information handling system of claim 6 wherein the software code is further effective to:
   package the geographic location in a location document, the location document further including a geographic location format and a link to one or more location-based privacy preferences that includes the retrieved location-based privacy preference.

8. The information handling system of claim 7 wherein the packaging is performed by a location server, the method further comprising:
   receiving the location document sent from the location server to the information handling system.

9. A computer program product stored in a computer operable media for managing location-based privacy preferences, said computer program product comprising:
   means for receiving a device identifier and location data corresponding to a device;
   means for retrieving a location-based privacy preference corresponding to the device identifier and the location data;
   means for comparing the retrieved location-based privacy preference with a privacy policy that corresponds to a service provider; and
   means for determining whether to send content provided by the service provider to the device based upon the comparison.

10. The computer program product of claim 9 further comprising:
    means for receiving the content and the service provider's location from the service provider, wherein the means for comparing further comprises:
       means for matching the service provider location with one or more location boundaries that correspond to the location-based privacy preference.

11. The computer program product of claim 10 further comprising:
    means for sending the content to a device corresponding to the device identifier in response to the comparison determining that the service provider's privacy policy and location are acceptable to the retrieved location-based privacy preference that corresponds to the service provider's location.

12. The computer program product of claim 9 further comprising:
    means for receiving a geographic location corresponding to a device that is associated with the device identifier; and
    means for selecting the location-based privacy preference from a plurality of location based privacy preferences based upon the geographic location, wherein each of the plurality of location based privacy preferences correspond to a different geographical area.

13. The computer program product of claim 9 further comprising:
    means for receiving the service provider's privacy policy from the service provider;
    means for selecting one or more device identifiers in response to the comparison of the location based privacy preference of each of the selected device identifiers with the received privacy policy; and
    means for sending the selected device identifiers to the service provider.

14. The computer program product of claim 9 further comprising:
    means for identifying a geographic location corresponding to the device identifier, wherein the retrieval of the location-based privacy preference is also based on the geographic location.

15. The computer program product of claim 14 further comprising:
    means for packaging the geographic location in a location document, the location document further including a geographic location format and a link to one or more location-based privacy preferences that includes the retrieved location-based privacy preference.

16. The computer program product of claim 15 wherein the means for packaging is performed by a location server, the computer program product further comprising:
    means for sending the location document to a location service agent device, wherein the location service agent device performs the receiving, retrieving, comparing, and determining.

17. An information handling system comprising:
    one or more processors;
    a memory accessible by the processors;
    a nonvolatile storage device accessible by the processors;
    a network interface for connecting the information handling system to a computer network; and
    a location-based privacy tool for managing user's location-based privacy preferences, the location-based privacy tool comprising software code effective to:
        receive a device identifier and location data corresponding to a device;
        receive content, a service provider's location, and a service provider's privacy policy from a service provider;
        retrieve a location-based privacy preference corresponding to the device identifier, wherein the service provider's location corresponds to the location data;
        compare the retrieved location-based privacy preference with the service provider's privacy policy;
        determine whether to send content provided by the service provider to the device based upon the comparison; and
        send the content to a device corresponding to the device identifier in response to the determination.

18. A computer program product stored in a computer operable media for managing location-based privacy preferences, said computer program product comprising:
    means for receiving a device identifier and location data corresponding to a device;
    means for receiving content, a service provider's location, and a service provider's privacy policy from a service provider;
    means for retrieving a location-based privacy preference corresponding to the device identifier, wherein the service provider's location corresponds to the location data;
    means for comparing the retrieved location-based privacy preference with the service provider's privacy policy;
    means for determining whether to send content provided by the service provider to the device based upon the comparison; and
    means for sending the content to a device corresponding to the device identifier in response to the determination.

* * * * *